(12) United States Patent
Hu et al.

(10) Patent No.: US 9,123,082 B2
(45) Date of Patent: Sep. 1, 2015

(54) PROVIDING RESOURCE CONSUMPTION RECOMMENDATIONS

(75) Inventors: Qingmin Hu, Sammamish, WA (US); Brian Kevin Daly, Seattle, WA (US); Jamie Toren, Atlanta, GA (US); Mark Edward Causey, Tucker, GA (US); Karen Mullis, Loganville, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 356 days.

(21) Appl. No.: 13/539,341

(22) Filed: Jun. 30, 2012

(65) Prior Publication Data
US 2014/0006329 A1      Jan. 2, 2014

(51) Int. Cl.
G06N 5/02      (2006.01)
G06Q 50/06    (2012.01)

(52) U.S. Cl.
CPC . *G06Q 50/06* (2013.01); *G06N 5/02* (2013.01)

(58) Field of Classification Search
CPC ......... G06Q 30/00; G06Q 50/06; G06N 5/02; G06N 5/04; G06N 99/005; G06F 17/00
USPC .......................................................... 706/46
See application file for complete search history.

(56) References Cited

U.S. PATENT DOCUMENTS

| | | | |
|---|---|---|---|
| 7,561,977 B2 | 7/2009 | Horst | |
| 2003/0233201 A1* | 12/2003 | Horst et al. | 702/62 |
| 2005/0075954 A1* | 4/2005 | Matsumoto et al. | 705/28 |
| 2007/0236346 A1* | 10/2007 | Helal et al. | 340/539.22 |
| 2009/0157587 A1* | 6/2009 | Lim et al. | 706/47 |
| 2009/0195349 A1* | 8/2009 | Frader-Thompson et al. | 340/3.1 |
| 2009/0261978 A1* | 10/2009 | Lee et al. | 340/573.1 |
| 2010/0076615 A1* | 3/2010 | Daniel et al. | 700/293 |
| 2010/0090806 A1* | 4/2010 | Schork et al. | 340/10.4 |
| 2011/0046805 A1* | 2/2011 | Bedros et al. | 700/291 |
| 2011/0125482 A1* | 5/2011 | Michelson | 703/21 |

(Continued)

OTHER PUBLICATIONS

Lee, H. et al., "UMONS: Ubiquitous Monitoring System in Smart Space", IEEE Transactions on Consumer Electronics, vol. 55, No. 3, Aug. 2009, pp. 1056-1064.*
Helal, S. et al., "The Gator Tech Smart House: A Programmable Pervasive Space", IEEE Computer Society, 2005, pp. 50-60.*
Han, D. et al., "Design and Implementation of Smart Home Energy Management Systems based on ZigBee", IEEE Transactions on Consumer Electronics, vol. 56, No. 3, Aug. 2010, pp. 1417-1425.*
Kofler, M. et al., "A semantic representation of energy-related information in future smart homes", Energy and Buildings, vol. 47, 2012, pp. 169-179.*
Marco, J. et al., "The Energy Aware Smart Home", IEEE 5th International Conference on Future Information Technology, 2010.*

*Primary Examiner* — Jeffrey A Gaffin
*Assistant Examiner* — Dave Misir
(74) *Attorney, Agent, or Firm* — Hartman & Citrin LLC

(57) ABSTRACT

The subject disclosure provides systems and methods for recommending optimal consumption of a variety of resources that may be consumed by a consumer. A recommendation provided by the system may be based upon resource-consumption statistics gathered by a plurality of sensors, consumer's resource-consumption behavior, consumer-defined criteria, resource availability, and a cost of consumption. The recommendation may include a recommendation on how the consumer may lower resource consumption costs. The recommendation may further include optimal consumption considering consumption trends of a plurality of consumers living in a geographical proximity. The recommendation may include optimal usage of a consumer's vehicle such that the vehicle may consume the least amount of energy. The recommendation may further include offer(s) of credit/incentives by resource providers to consumers in exchange for less consumption of resource, alternative consumption of resources, and any combination thereof.

20 Claims, 10 Drawing Sheets

(56) References Cited

U.S. PATENT DOCUMENTS

| | | | |
|---|---|---|---|
| 2011/0137846 A1* | 6/2011 | Kim et al. | 706/50 |
| 2011/0202196 A1* | 8/2011 | Venkatakrishnan et al. | 700/295 |
| 2011/0202783 A1* | 8/2011 | Venkatakrishnan et al. | 713/340 |
| 2011/0231320 A1* | 9/2011 | Irving | 705/80 |
| 2011/0282808 A1* | 11/2011 | Amram et al. | 705/412 |

* cited by examiner

PROVIDING RESOURCE CONSUMPTION RECOMMENDATIONS

BACKGROUND OF THE SUBJECT DISCLOSURE

1. Field of Disclosure

The subject disclosure relates to providing resource consumption recommendations. More specifically, the subject disclosure relates to providing consumers of resources with recommendations on optimal consumption of such resources while considering the consumers' needs.

2. Background of Disclosure

Many daily tasks require use of resources such as electricity and water. From recharging mobile device batteries to microwaving food to cleaning with water, humans cannot survive if access to energy resources is disrupted. On the other hand, rise in the demand for resources, rise in the price of consuming such resources, and the looming problem of such resources becoming scarce, have all prompted the need for less consumption combined with a smart consumption of resources. When people consume resources inside their homes, they may not be able to obtain a good sense of how resources are being consumed and how much of a particular resource may be consumed unnecessarily. For example, consumers may not be aware of how efficient their appliances are or that running a dishwasher during peak hours may cost them a lot more than during off-peak hours. Household residents may not be aware that three people using three different showers simultaneously in the morning may result in less water pressure and a larger water bill. In addition, when consumers use their vehicles, they may not be able to determine which routes to take and which tasks to accomplish with each instance of using the vehicle so as to obtain optimal and most energy efficient use out of their vehicle. As a consequence, most consumers today are unable to obtain optimal consumption of their resources while keeping in mind resource availability, resource needs, and budget constraints.

SUMMARY OF THE SUBJECT DISCLOSURE

The present invention solves these and other problems in the art by providing a method and system for recommending optimal consumption of a variety of resources that may be consumed by a consumer. In one example embodiment, the subject disclosure is a system for providing a recommendation for optimal resource consumption to a consumer. The system includes a server on a network including a memory and a processor and a logic on the memory for analyzing a plurality of resource consumption statistics received from a sensor, the sensor being connected to an equipment consuming a resource, and generating a recommendation on optimal resource consumption based on the analysis.

In another example embodiment, the subject disclosure is a method for providing a recommendation on optimal resource consumption to a consumer. The method includes analyzing a plurality of resource consumption statistics received from a sensor, the sensor being connected to an equipment consuming a resource, and generating a recommendation on optimal resource consumption based on the analysis.

In yet another example embodiment, the subject disclosure is a computer-executable code stored on a computer-readable medium which when executed by a processor enables a server to provide a recommendation on optimal resource consumption to a consumer. The code includes an instruction for analyzing a plurality of resource consumption statistics received from a sensor and an instruction for generating a recommendation on optimal resource consumption based on the analysis.

In yet another example embodiment, the subject disclosure is a method to pull cost data from resource providers as inputs to the algorithm that will calculate the related cost based on the usage patterns so a recommendation can be formulated.

In most of the situations, the system assumes that a user will be flexible in following the recommendations. In some cases, the system will provide a mechanism for user inputs about their preference or must do list (for example, a certain task must be performed at a given time due to the family schedule). This input will be available to the algorithm so such cases can be accounted for and suitable adjustments be made in the cost calculation and recommendation.

DETAILED DESCRIPTION OF THE SUBJECT DISCLOSURE

Figure 1:
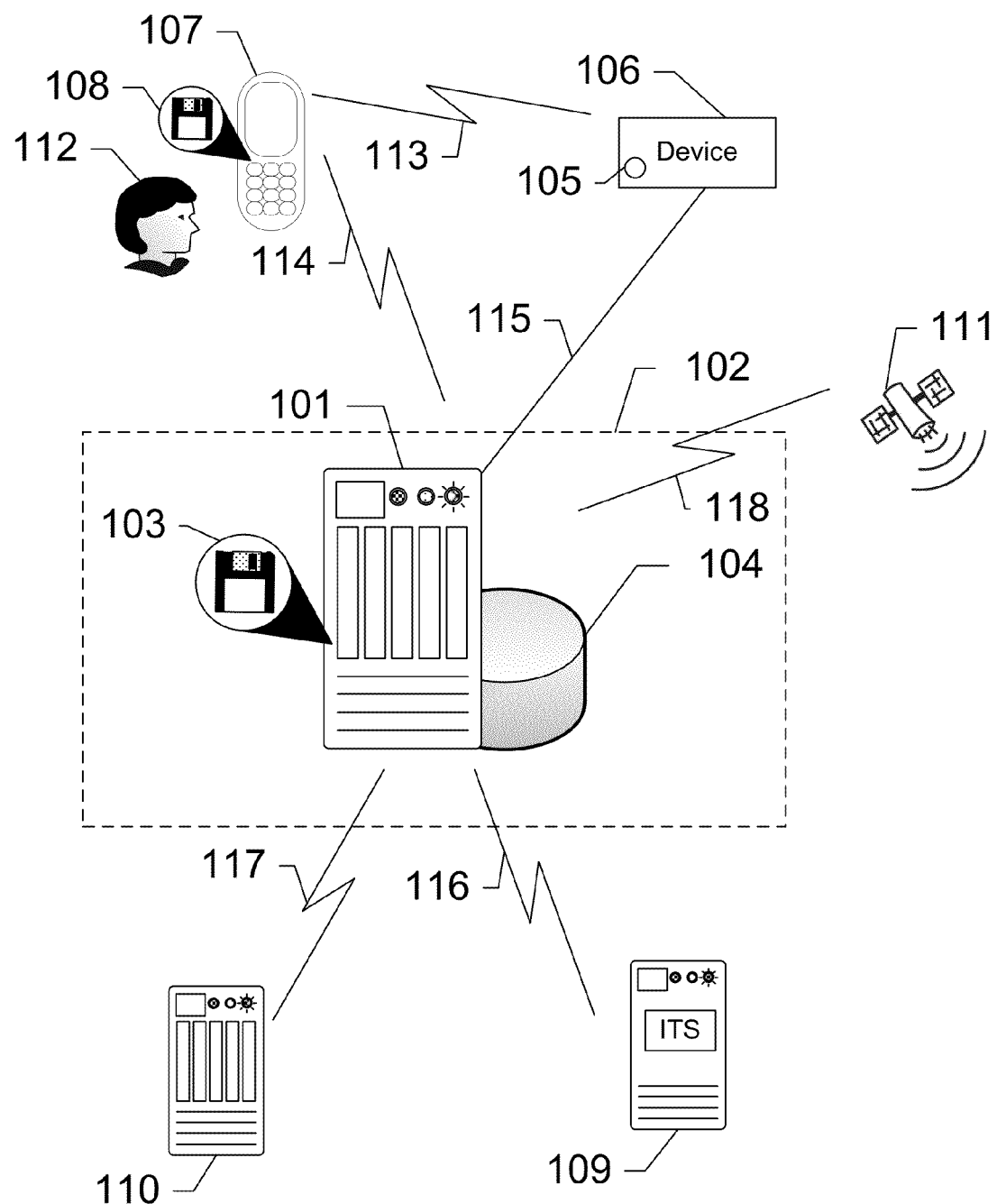
FIG. 1 shows a system for providing consumers with recommendations on optimal resource consumption, according to an example embodiment of the subject disclosure.

The subject disclosure provides systems and methods for recommending optimal consumption of a variety of resources that may be consumed by a consumer, whether inside or outside the consumer's home. The system may include a variety of sensors for monitoring resource consumption and collecting a variety of statistical data related to resource consumption. The system may further include a server for receiving the collected statistical data pertaining to each source, each resource-consuming device, or any combination thereof. The server may be in communication with a plurality of resource servers belonging to resource providers to determine cost of resources at different time periods throughout a day. Resource providers may include, for instance, utility companies, gas stations, and other parties that the consumer may transact with in order to buy a resource. Logic may be located on the server carrying algorithms for determining optimal use of resources, determining particular consumer behavior as it may relate to consumption of resources, or any combination thereof. These determinations may be based on collected statistical information regarding how a consumer may consume resources as well as resource availability, cost information obtained from resource servers, or any combination thereof.

A consumer may sign up for the above service, which may include downloading an application on the consumer's mobile device, and installing a variety of sensors distributed at different locations. Sensors may be installed at end equipment such as electronic appliances, at power outlets, electrical meters, at a variety of plumbing outlets such as showers, sinks, etc., inside a consumer's vehicle, and at any other point in the delivery system of that resource. The sensors may be registered with the server by having their pertinent information entered into the application, their corresponding registration number being scanned, or an image of information identifying each sensor being communicated to the server. Once recorded, these sensors may collect a variety of statistics such as frequency of consumption, time of consumption, duration of consumption, etc. and may subsequently relay collected statistics to the server. Sensors may also be capable of receiving commands from the server directing them to regulate supply of resources such as electricity, water, gas or any combination thereof, to the end equipment to which they are connected.

Additional sensors may be distributed throughout the consumer's home or coupled to the consumer's person, clothing, etc. for collecting behavioral or statistical data regarding the consumer's use of resources. As mentioned, sensors may also be deployed inside the consumer's vehicle for monitoring a variety of statistics including how long the vehicle may have been used, how often it may be used, and what may be the driving behavior of the driver or the consumer. There may also be an inventory tracking system (ITS) installed inside the consumer's home that may also be accessed. The ITS may track items present inside the consumer's home, their numbers/quantities, locations, etc. and may provide alerts when any of the items are depleted or are near depletion thus needing to be replaced.

All the statistical data gathered above may then be relayed to the server. Logic on the server may combine statistical data related to the consumer's vehicle with inventory data received from the ITS. This combination may allow the server to recommend to the consumer to pick an item which the consumer may be running out of at home while driving back from work so as to get optimal mileage out of the vehicle's gas and avoid unnecessary extra trips to a store to obtain a replacement for the depleted item. The server may also recommend alternative routes, carpooling, etc. in order for the consumer to save on gas.

A mobile device belonging to the consumer may be in communication with sensors. Statistical data sensed at the sensors may be communicated to the mobile device, which in turn may forward the statistical data to the server. The mobile device may append further details to the statistical data such as time, location, or any user-defined attributes and preferences. Sensors may also be in direct communication with the server via a network such as the Internet. A profile may be created on the server for each consumer who may sign up for the service. The statistical data and any other information gathered by sensors for each consumer may be saved under his or her profile on the server. Once the server gathers all the data and statistics along with any relevant information from the resource providers, the server may perform an analysis through logic located on the server to provide a variety of feedbacks and recommendations to the consumer. The provided feedbacks may include statistics on how the consumer's equipment may consume resources, how much the consumer may be paying in resource costs, etc. The server may then provide a variety of alternative recommendations on what steps the consumer may be able to take in order to consume less, smarter, or any combination thereof, including resource consumption during off-peak hours, unplugging equipment that may not need constant supply of resources, etc. Statistical data stored on the consumer's profile may be provided in part to third parties to observe usage trends and to improve services and provide offers. For instance, the consumer's statistical data may be stored on a layer within a multi-layered database, with each layer being accessible only to specific entities.

In an alternative embodiment a consumer may be able to input a variety of tasks that he may need or desire to perform. The server may then present a recommendation on optimal resource consumption, after having considered factors such as tasks needing to be accomplished, availability of resources needed, the cost of using such resources, etc. Alternatively, the server may learn common tasks over time that the consumer usually accomplishes without the consumer having to input tasks to be accomplished, and may thus modify the supply of resources to other equipment in order to accomplish the common tasks. For example, the system may learn over time that the consumer's battery powered vehicle needs to be fully charged every morning. The server may send commands to other equipment to use less power so that the vehicle may be fully charged in the morning ready to be used by the consumer.

In yet another alternative embodiment, the server may be able to gather statistical data on resource consumption for a variety of consumers residing in a geographical proximity or a community served by one or more resource providers. For instance, sensors may be placed at various points in the "last mile" of the power grid serving the community, and statistical data for the community collected and transmitted to the server. Given the capability of resource providers in terms of resource generation and the consumption behavior of the community, the server may provide recommendations to both consumers and resource providers on amount of resources needed as well as optimal consumption of available resources. The server may also communicate the statistical data to the resource servers. Resource providers may offer credits to each consumer depending on the supply and demand for a particular resource. The offers may be communicated back to the server and may in turn be presented to the consumer as an incentive for increased or decreased resource consumption during certain time periods.

There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

FIG. 1 shows a system for providing consumers with recommendations on optimal resource consumption, according to an example embodiment of the subject disclosure. The system can include a server 101 that may be located on a network 102. For instance, server 101 may be located at a resource provider servicing the consumers and accessible via network 102. Network 102 may include broadband wide-area networks such as the Internet, cellular networks, local-area networks (LAN), and personal area networks, such as near-field communication (NFC) networks including BLUETOOTH®, or any combination thereof. In some instances, server 101 may be located within a home or building associated with the consumer, for instance, a home, an office, a car, etc. In either case, network 102 may enable communication between server 101 and a plurality of sensors 105. Server 101 may include a logic 103 and a database 104 for storing a plurality of statistics and information related to resource consumption gathered by sensors 105. Sensors 105 may be coupled to an end equipment 106. End equipment 106 may be any equipment that may consume one or more types of resources such as gas, water, electricity, and any combination thereof. End equipment 106 may include electrical appliances, entertainment and communication devices, fixtures connected to a building's plumbing system, a vehicle, power consuming equipment, resource outlets, and water/electricity/gas meters, etc. Examples of electrical appliances may include refrigerators, microwaves, lighting equipment, dishwashers, washers/dryers, etc. Examples of entertainment and communication devices may include home-entertainment systems, audio devices, computers, networks and associated equipment, telephones, intercoms, video game systems, wireless devices, etc. Examples of fixtures connected to a building's plumbing systems include shower faucets, sink faucets, dishwashers, washers/dryers, ice machines located inside a freezer, etc. In some instances, sensors may even be coupled to features of a building such as a chimney, window, basement, etc. for purposes of detecting ventilation, air quality, energy efficiency, leaks, etc. that may waste resources. Examples of vehicles that may be monitored via sensors 105 include gas powered vehicles, electrical vehicles, hybrid vehicles, motorcycles, bicycles, private boats, private planes, etc. Examples of resource outlets include power outlets located throughout a building, water distribution pipes servicing one or more water consuming equipment, gas pipelines servicing one or more gas consuming equipment, etc., as well as "last mile" delivery mechanisms such as those serving a community, locality, etc.

End equipment may further be network-capable. For instance, sensors 105 connected to all the above mentioned equipment may be capable of receiving commands from server 101 directing them to regulate and adjust the supply of resources to their corresponding end equipment.

Sensors 105 may further be in communication with a mobile device 107 belonging to a consumer 112, through wireless connections such as connection 113. Mobile device 107 may be any of a cellular phone, a PDA, an iPad, a laptop computer, etc. Mobile device 107 may also be in communication with server 101 through connection 114. Mobile device 107 may have a logic 108 installed on it, enabling the consumer to communicate with server 101. The communication may include the consumer asking for certain resource needs, the consumer controlling and adjusting resource consumption by certain equipment, the server communicating recommendations to the consumer, etc. Logic 108 may also be stored on a stationary electronic device such as a desktop computer, a television set connected to the Internet (IPTV), a landline telephone, etc. When communicating data regarding resource consumption by a vehicle, application 108 may also be accessible via an electronic interface located inside the vehicle such as a control panel, a GPS display, etc. Sensors 105 may also be in direct communication with server 101 through either a wired and/or a wireless connection such as connection 115, for relaying statistical data to and receiving commands from server 101.

Logic 103 may be utilized to perform tasks such as an analysis on resource consumption, combining data from one or more sources to generate and transmit a recommendation to the consumer for optimal resource consumption, and any combination thereof. For instance, logic 103 may analyze data received from sensors 105 by recognizing resource consumption trends, inferring consumer resource consumption behavior, etc. Logic 103 may further receive consumer-defined criteria or constraints from user 112 operating mobile device 107, inventory data from an inventory tracking system (ITS) 109 over connection 116, resource data from resource servers 110 over connection 117, and location data from a global positioning system (GPS) satellite 111 over connection 118, and any combination thereof. Location data from satellite 111 may be used in conjunction with the other received information to determine locations where the consumer may obtain more resources, such as gas stations, electrical charging stations for electric vehicles, merchants where the consumer can obtain depleting items as indicated by ITS 109, etc. Logic 103 may then provide a recommendation to a consumer regarding his resource consumption trend and cost and how he may improve resource consumption, lower consumption cost and any combination thereof. The recommendation may include specific information such as locations of nearby gas stations/merchants, offers and coupons from the merchants, etc. Logic 103 may provide a recommendation as to alternative patterns of resource consumption by comparing how two or more consumers located in the same geographical area are consuming resources. Logic 103 may provide a recommendation for vehicle usage including alternative routes, how far a vehicle can travel on current remaining fuel source, nearest location where the consumer may charge his vehicle or obtain gas, and any combination thereof. Logic 103 may be comprised by digital or analog hardware circuits and any combination thereof, comprising logical AND, OR, XOR, NAND, NOR, and other logical operations, as well as being formed from combinations of software and hardware.

ITS 109 may be in communication with server 101 over connection 116, which may be a wired connection, a wireless connection, or any combination thereof. ITS 109 may keep track of items that may have been purchased or used by the consumer, such as clothes, food, and other consumables. ITS 109 may further monitor the state of such items. Server 101 may receive an alarm or an indication from ITS 109 that a certain item may be near depletion and may need replacement. Logic 103 may in turn incorporate this data into the optimal resource consumption analysis and the ultimate recommendation that may be provided to the consumer. For example, a recommendation to the consumer regarding optimal vehicle resource consumption may be combined with a recommendation to the consumer to purchase milk from a grocery store on the way home so as to avoid an unnecessary extra trip, thus saving fuel. Server 101 may obtain data regarding optimal locations to pick up depleting items from GPS 111.

Moreover, server 101 may be in communication with one or more resource servers 110. A variety of data may be obtained from resource servers 110. For example, price and charging rate for using resources at different time periods throughout a day may be obtained and incorporated into the optimal resource consumption analysis performed by logic 103. Resource servers 110 may further provide information on resource availability and capacity of resource providers. For example, a power company servicing a certain geographical area may indicate that the maximum power that the company may be able to provide for consumption in the area is limited to a specific number of megawatts (e.g., 2000 Megawatts). This information may be employed by logic 103 when determining optimal electrical power consumption for a plurality of consumers in the area. Furthermore, resource providers through resource servers 110 may receive the statistical data related to resource consumption of one or more consumers from database 104. Authorization to retrieve such data may be monitored and provided by user 112, server 101 and any combination thereof, depending on the contractual relationship between either of user 112, the service provider, and the resource provider. Based on trends in consumer consumption, community consumption, etc., resource servers 110 may include logic for providing incentives such as offers, etc. to consumers for less consumption or to change their pattern of consumption. The incentives may be communicated to device 107 via server 101 or via any other method. For example, when a consumer is consuming electricity well above the average amount of electricity used by others in the same area during peak-hours, resource server 110 belonging to the power provider may offer credits, discounts, and any combination thereof to the consumer if the consumer agrees to consume less electricity during peak hours.

Figure 2A:
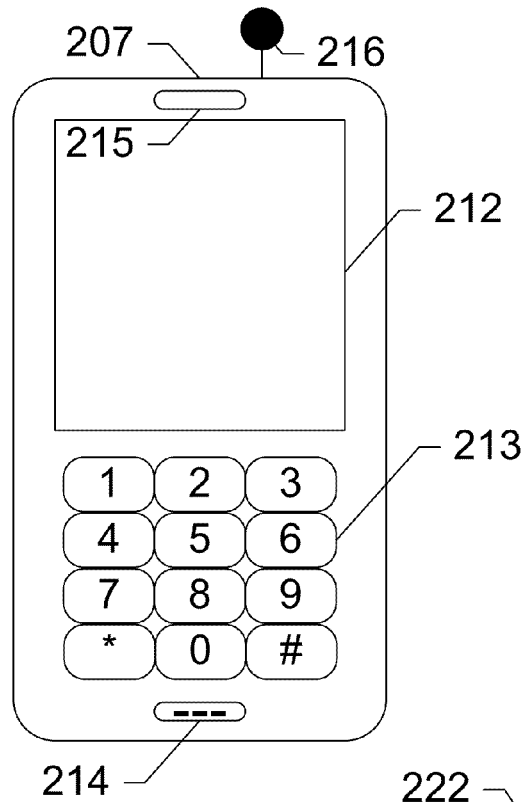
FIGS. 2A-B show a mobile device for communication with a sensor and a server according to an example embodiment of the subject disclosure.
Figure 2B:
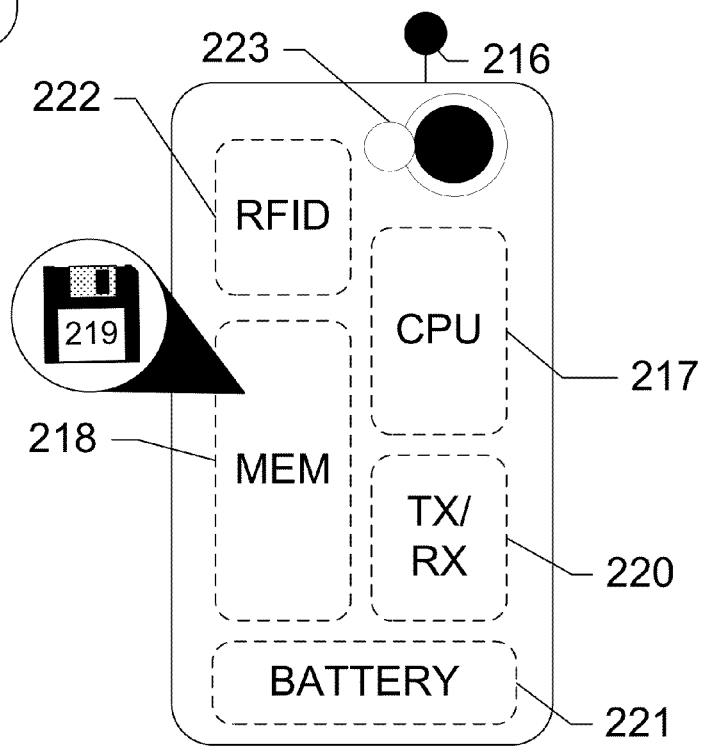

FIGS. 2A-B show a mobile device for communication with a sensor and a server according to an example embodiment of the subject disclosure. FIG. 2A shows a mobile device 207, including a display 212, an input 213, a microphone 214, a speaker 215, and an antenna 216. Display 212 may be used as visual output for mobile device 207, and may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. For example, display 212 may be used to show an interface for receiving recommendations, as further described herein. Input 213 may be a keypad used for entering pertinent information into mobile device 207. For example, input 213 may be used to enter consumer defined criteria such as limits on costs, as well as define end equipment to which constant resource may need to be supplied, end equipment that may not need constant supply of resources, etc. Display 212 may also incorporate a touch screen technology thus allowing an alternative to using input 213, when inputting information. Mobile device 207 may further include a microphone 214 through which voice communication regarding consumer-defined criteria may be communicated to a server. For example, a consumer may speak into microphone 214 to issue a voice command disconnecting power supplied to the microwave as it may not be needed. Mobile device 207 may further include a speaker 215, through which the server may communicate back to the consumer information including but not limited to statistics on resource consumption, recommendations on optimal resource consumption, etc. Microphone 214 and speaker 215 may utilize any currently known or later developed technologies including current speakers being employed in consumer mobile devices, and may enable voice communication with users of other mobile devices over, for instance, a cellular network. Audio output through external speakers is also possible, such as headsets, hands-free systems, etc. Antenna 216 may be a transducer for transmitting and receiving wireless radio frequency (RF) signals to and from wireless networks, network nodes, and other wireless communication devices including a wireless base transceiver station (BTS), WiFi access point, etc. Antenna 216 may be used to communicate data to and from a plurality of sensors as well as to and from a server.

Referring now to FIG. 2B, additional components of mobile device 207 may include a processor 217, a memory 218 storing logic 219, a transceiver 220, a battery 221, a radio frequency identifier (RFID) reader 222, a camera 223. Processor 217 may be used to execute various functions when instructed to do so by programs and logic 219 stored on memory 218, or on other data storage of mobile device 207. Processor 217 can incorporate any presently known or later developed technologies including computer processors (processing units), microprocessors, digital signal processors, controllers and microcontrollers, etc. Logic 219 may include an operating system to provide an environment for a consumer to interact with mobile device 207, including managing inputs and outputs for use with programs running within the operating system. For instance, logic 219 may include a touch screen logic for receiving touch input from display 212 and associating the touch input with a function.

Furthermore, logic 219, when combined with a transceiver 220, may be used to communicate with a sensor such as sensor 105 and/or a server such as server 101. Transceiver 220 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Battery 221 may be used to power the components of mobile device 207. Battery 221 can be any of the presently known or later developed technologies used in mobile devices or used in powering communication components including lithium-ion batteries, lithium-polymer batteries, molten salt batteries, etc.

Mobile device 207 may further include one or both of a radio-frequency identification (RFID) reader 222 and an optical sensor such as camera 223. RFID reader 222 may be used to wirelessly capture a product identifier such as an RFID tag coupled to end equipment, devices, or any associated sensor that may have RFID tags. Data transfer between an RFID tag and an RFID reader may be performed based on using radio-frequency electromagnetic fields. Camera 223 may also be used to capture an image of identifying information corresponding to end equipment or any associated sensor. The detected RFID tags, the captured images, and any combination thereof, may subsequently be sent via transceiver 220 to the server, where they may be processed and relevant product information may be extracted and recorded. Utilization of the RFID and camera components will be discussed in further detail with respect to FIG. 8A described below.

Further, logic 219 may include a voice recognition algorithm. When a consumer speaks consumer-defined criteria, equipment information, etc. into microphone 214, the voice recognition algorithm may record what is being spoken. Logic 219 may process what was recorded and may then convert it to text to be sent to the server via transceiver 220.

Many wireless communication devices may have more than one transceiver or a transceiver that supports more than one protocol. A single wireless communication device can support cellular radio frequency (RF), GSM, GPRS, UMTS, W-CDMA, LTE, NFC, WiFi, BLUETOOTH®, ZIGBEE®, and Z-WAVE® protocols. A wireless communication device capable of multiple modes of wireless communication, such as cellular, WiFi, NFC, etc., may contain a plurality of antennas on a single device. For example, an NFC-enabled wireless communication device may have separate antennas for cellular and NFC communications.

Figure 3:
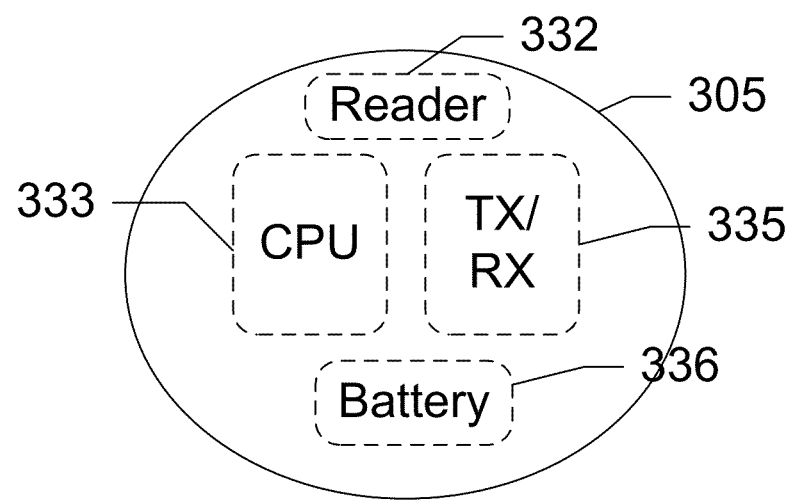
FIG. 3 shows components of a sensor, according to an example embodiment of the subject disclosure.

FIG. 3 shows components of a sensor, according to an example embodiment of the subject disclosure. Sensor 305 may be installed within or connected to an end equipment such as end equipment described herein. The inner components of sensor 305 may include a reader 332, a processor 333, a transceiver 335, and a battery 336. Reader 332 may include any currently known or later developed technologies capable of reading an amount of resource that may be consumed. For example, reader 332 may be any of an alternative current (AC) current reader, AC voltage reader, Ampere Hour (Ah) reader, water flow reader, gas reader, etc. Furthermore, reader 332 may be capable of collecting identifying information corresponding to the equipment to which it may be connected. For example, the identifying information that may be captured by reader 332 may include brand of the product, date of manufacturing of the product, features of the product, color of the product, etc. Consequently, reader 332 may include combinations of different types of readers.

Processor 333 may be used to execute various functions when instructed to do so including facilitating transfer of data from reader 332 to transceiver 335 for communication with mobile devices, servers, etc. Processor 333 can incorporate any presently known or later developed technologies including computer processors (processing units), microprocessors, digital signal processors, controllers and microcontrollers, etc. A Microcontroller included in processor 333 may be used to start, stop, and/or adjust supply of a resource to the equipment to which sensor 305 may be connected.

Transceiver 335 may receive instructions from a server or mobile device regarding these adjustments. Processor 333 may receive that data from transceiver 335 and may in turn direct the end equipment to perform the necessary adjustment. Instructions received by transceiver 335 may have been communicated from a mobile device as described herein, a server as described herein, and any combination thereof. Transceiver 335 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Battery 336 may be used to power sensor 305. Battery 336 can be any of the presently known or later developed technologies used in sensor devices for powering communication components including Lithium-Ion batteries, lithium-polymer batteries, molten salt batteries, cell batteries, etc. Battery 336 may be replaced with or used in addition to an interface for supplying power to sensor 305, the interface receiving power from the end equipment, an AC power source, and any combination thereof.

Figure 4:
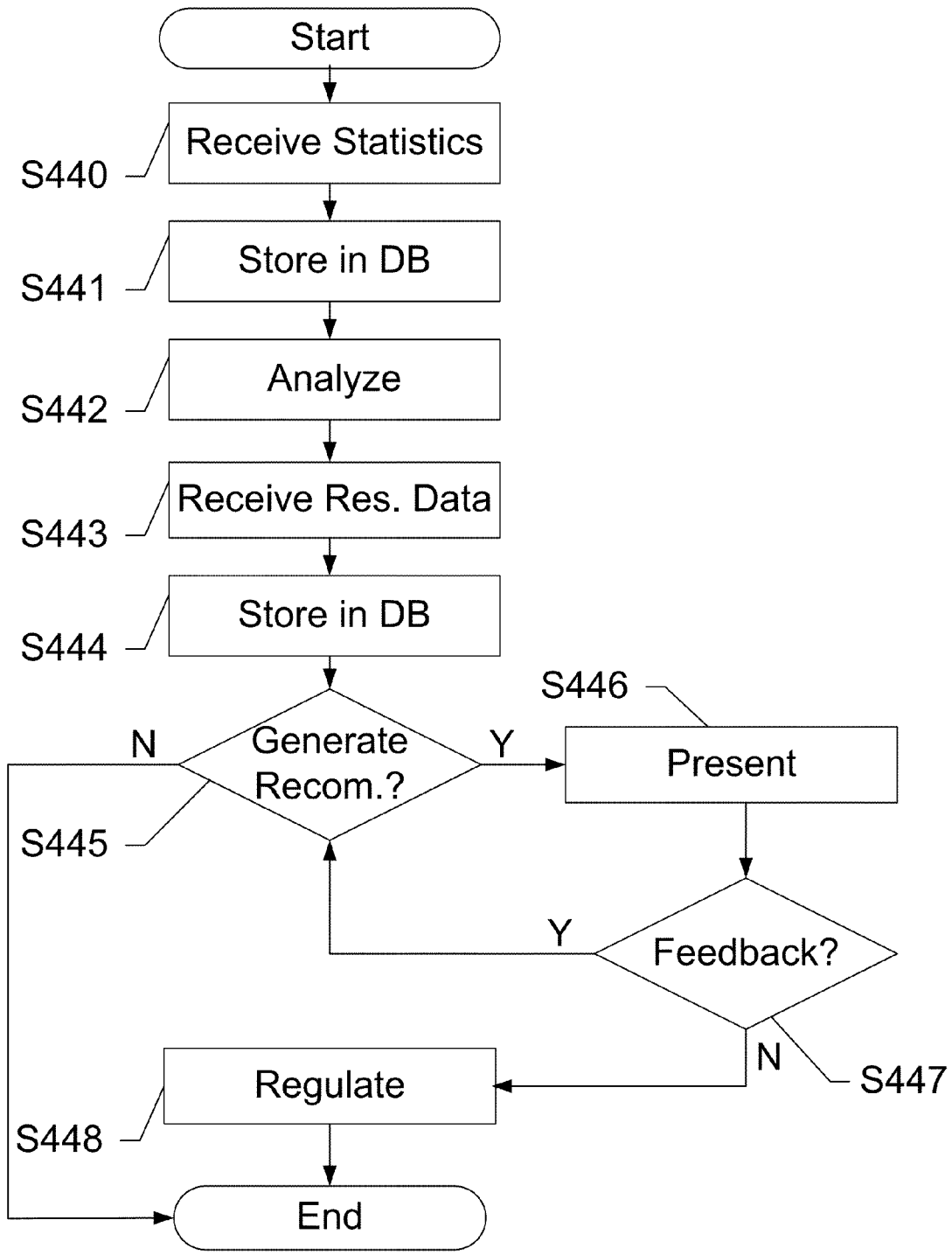
FIG. 4 shows a method for recommending optimal resource consumption to a consumer, according to an example embodiment of the subject disclosure.

FIG. 4 shows a method for recommending optimal resource consumption to a consumer, according to an example embodiment of the subject disclosure. The method may begin with receiving statistical data regarding resource consumption (S440). As discussed above, statistical data regarding resource consumption may have been collected via a variety of sensors. Statistical data are then stored in a database (S441). The database may be a part of a server receiving the statistical data, a local database in communication with the sensors, a cloud database associated with a user profile, etc. Logic on the server may then perform a variety of analyses on the stored statistical data (S442). The analyses performed may include determining trends in times of resource consumption, frequency of resource consumption, amount of resource consumption, number of end equipment using the same resource separately, and/or simultaneously, number of end equipment using a combination of two or more resources, etc. For example, the logic may determine the amount of electricity used in the consumer's kitchen versus the amount used in the living room. Alternatively, the logic may determine which equipment use resources constantly and which ones use resources sporadically. The analyses may further include a determination of activities performed regularly by a consumer. For example, the logic may determine that the consumer may be using a specific outlet located in the master bedroom to charge his or her mobile device's battery every night. The logic may further determine that the consumer may use a power outlet located in the garage to charge his or her electrical vehicle's battery every evening. Furthermore, the logic may determine that for example, the consumer may be using the shower every morning between 6:30 a.m. and 7:00 a.m. for a period of 10 minutes.

The server may additionally obtain data from resource providers, for instance via the resource servers described herein (S443). Data from resource servers may include resource availability, consumption prices for different time periods throughout a day, prices for different days of the year, including holidays, etc. The analyses performed by the logic in S442 and/or resource data obtained by the server in S443 may be stored in the database for future references (S444).

These analyses may also be used to determine whether or not a recommendation regarding resource consumption should be presented to the consumer (S445). Such a determination may be triggered by a consumer-initiated request to obtain a recommendation, on a consumer-specified time to present the recommendation, automatically generating the recommendation, and any combination thereof. For example, the consumer may have specified, upon subscribing to the system, that a recommendation on optimal resource consumption be sent to the consumer at the end of each month, billing cycle, etc. Alternatively or additionally, the consumer may initiate such a request at any time that he or she may desire. In an event when there is no consumer-specified time nor any spontaneous request by the consumer, the server may automatically decide to present the report to the consumer through an e-mail message, a push notification popping up on the consumer's mobile device, etc. This may occur if, for instance, a resource consumption trend crosses a predefined or default threshold or limit, for instance, a cost limit associated with the consumer's budget.

If the server determines that no recommendation may be needed, the method may end. However, should the server deem the generation of a recommendation appropriate, the recommendation may be generated and subsequently presented to the consumer (S446). The generated recommendation may include an overview and a report including detailed statistical data on resource consumption and related costs. Information obtained from resource servers may be included in the recommendation. Once the consumer receives this report, he or she may provide feedback to the server (S447). For instance, the consumer may have the option of accepting the recommendation, rejecting the recommendation, saving the recommendation to be reviewed later, and any combination thereof. The consumer may provide feedback including specifying a budgetary constraint on resource costs in any given month, consumption limitation for a given resource such as water, gas, and/or electricity, consumption limitation by an equipment, tasks to be performed on a daily basis, etc.

If the consumer does not provide feedback, the logic may proceed to regulating the supply of resources to equipment so as to comply with the recommendation (S448). For example, the recommendation may have included suggestions to automatically cut the supply of electricity to the power outlets connected to the consumer's television between the hours of 12:00 a.m. and 7:00 a.m., since the television set may have never been used during that time period. The regulation of supply of resources to equipment may be carried out by the logic sending control commands directly to the end equipment that is subject to the regulation. In the alternative, the logic may send the control command to the consumer's mobile device, the appropriate sensors coupled to the end equipment, or any combination thereof.

However if feedback is provided, the process may revert back to S445, wherein a new recommendation based on the feedback provided by the consumer may be generated. For example, when the consumer indicates that he or she may want to spend no more than $200 on electricity per month, the logic may take this limitation into consideration and generate a new optimal resource consumption recommendation. This recommendation may identify end equipment to which the supply of electricity may be cut and/or lessened for certain time periods due to the end equipment consuming more than normal amount of electricity. For instance, the recommendation may suggest unplugging end equipment that are not actively used but are nevertheless connected to an outlet, thus saving a small amount of electricity so as to meet the $200 budgetary constraint specified by the consumer. The recommendation may even include suggestions on upgrading or fixing old equipment, improving home insulation, etc., and may depend on the in-home sensors coupled to building features as described above.

Figure 5:
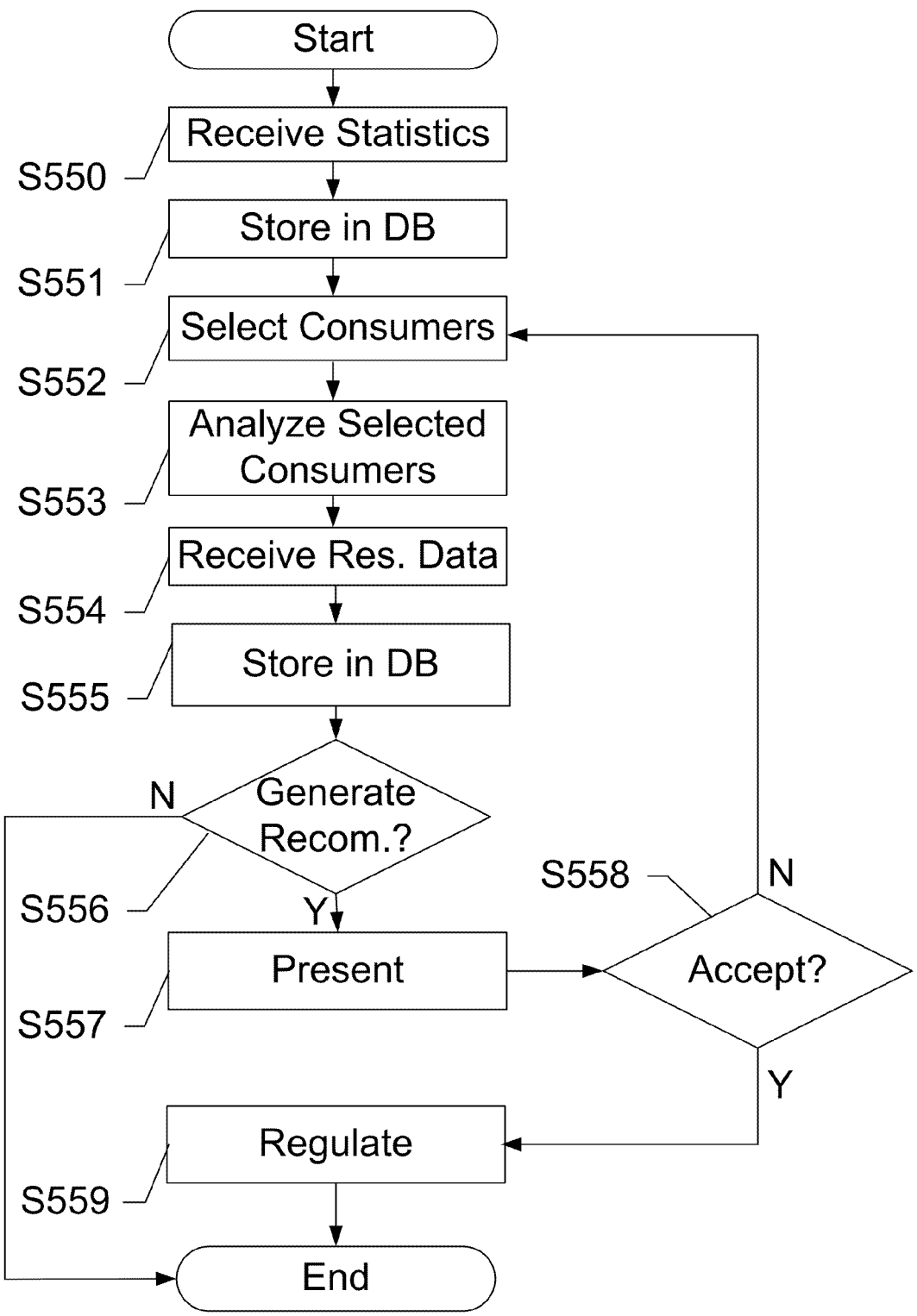
FIG. 5 shows a method for recommending optimal resource consumption to a group of consumers living in a geographical proximity, according to an example embodiment of the subject disclosure.

FIG. 5 shows a method for recommending optimal resource consumption to a group of consumers living in a geographical proximity, according to an example embodiment of the subject disclosure. The method may begin with receiving statistical data regarding resource consumption (S550). As discussed above, statistical data regarding resource consumption may have been collected via a variety of sensors such as sensors described herein, and transmitted to the server. Statistical data are then stored in a database such as database 104 or any other type of database described herein (S551). A logic located on the server such as the logic described herein, may then search through the database and select statistical data corresponding to consumers located in the same geographical proximity (S552). This may include residential houses, businesses, schools, and government facilities located in the same geographical area. The geographical area may be determined based on postal address, a community serviced by a single electrical power provider, a single water provider, a single gas provider, a city, a town, etc. Once the relevant statistical data have been extracted from the database, the logic may perform a variety of analyses on the extracted statistical data (S553) such as recognizing trends, etc. as described herein. For example, the logic may determine the majority of consumers located in the same geographical proximity are using a power outlet located in their garage to charge their electrical vehicle's battery every evening. The logic may further determine that for example, the majority of consumers located in the same geographical proximity may be using the shower every morning between 6:30 a.m. and 7:00 a.m.

The logic on the server may further obtain data from resource providers such as resource servers described above (S554). Data from resource servers may include consumption charging rates for different times, days, localities, rate plans, etc. The analyses performed by the logic in S553 and resource data obtained by the server in S554, may be stored in the database for future references (S555).

Having determined resource consumption by consumers in the same geographical proximity, the amount of resource available to service the consumers, and the cost of such resources to the consumers, the logic may determine if a recommendation may be needed (S556). Such determination may be based on a consumer-initiated request to obtain a recommendation, on a consumer-specified time to present the recommendation, or may be automatic. For example, the consumer may have specified, upon subscribing to the system, that a recommendation on optimal resource consumption be sent to the consumer at the end of each month, billing cycle, etc. Alternatively, the consumer may even initiate such a request at any time that he or she may desire. In an event when there is no consumer-specified time nor any spontaneous request by the consumer, the server may automatically decide to present the report to the consumer through an e-mail message, a push notification popping up on the consumer's mobile device, etc. The consumer may then have the option of accepting the recommendation, rejecting the recommendation, saving the recommendation to be reviewed later, and any combination thereof.

If the server determines that no recommendation may be needed, the method may end. However, should the server deem the generation of a recommendation appropriate, the recommendation may be generated and subsequently presented to the consumer (S557). For example, the logic may use the data regarding the consumption of electricity during evening hours, the capacity of electricity provider servicing the designated geographical proximity, and the associated consumption cost in generating the recommendation. The logic may recommend that the cost of using electricity and or demand for the electricity during evening hours can be decreased if consumers use electricity for charging their vehicles' battery at different time periods. This recommendation may be in a form of a personalized schedule of consumption for each consumer including one or more suggested times for initiating the charging of the vehicle. The personalized schedules may be based on optimal resource consumption and optimal cost to the consumers.

Each consumer may then have the option to accept or reject the recommended resource consumption (S558). If the consumer accepts the recommendation, the process may proceed to regulating the equipment to comply with the accepted recommendation (S559). For example, if the suggested schedule for one consumer had been to avoid charging the vehicle between 7:00 p.m. and 10:00 p.m., the logic may send control commands to sensors associated with power outlets located inside the consumer's garage to not output any electricity during that period. In the alternative, the logic may send the control command to the consumer's mobile device or stationary electronic device to be relayed over to the appropriate sensors. However, if the consumer rejects the recommendation, the process may revert back to S552, at which point the process may be carried out for other consumers in the geographical proximity.

Figure 6:
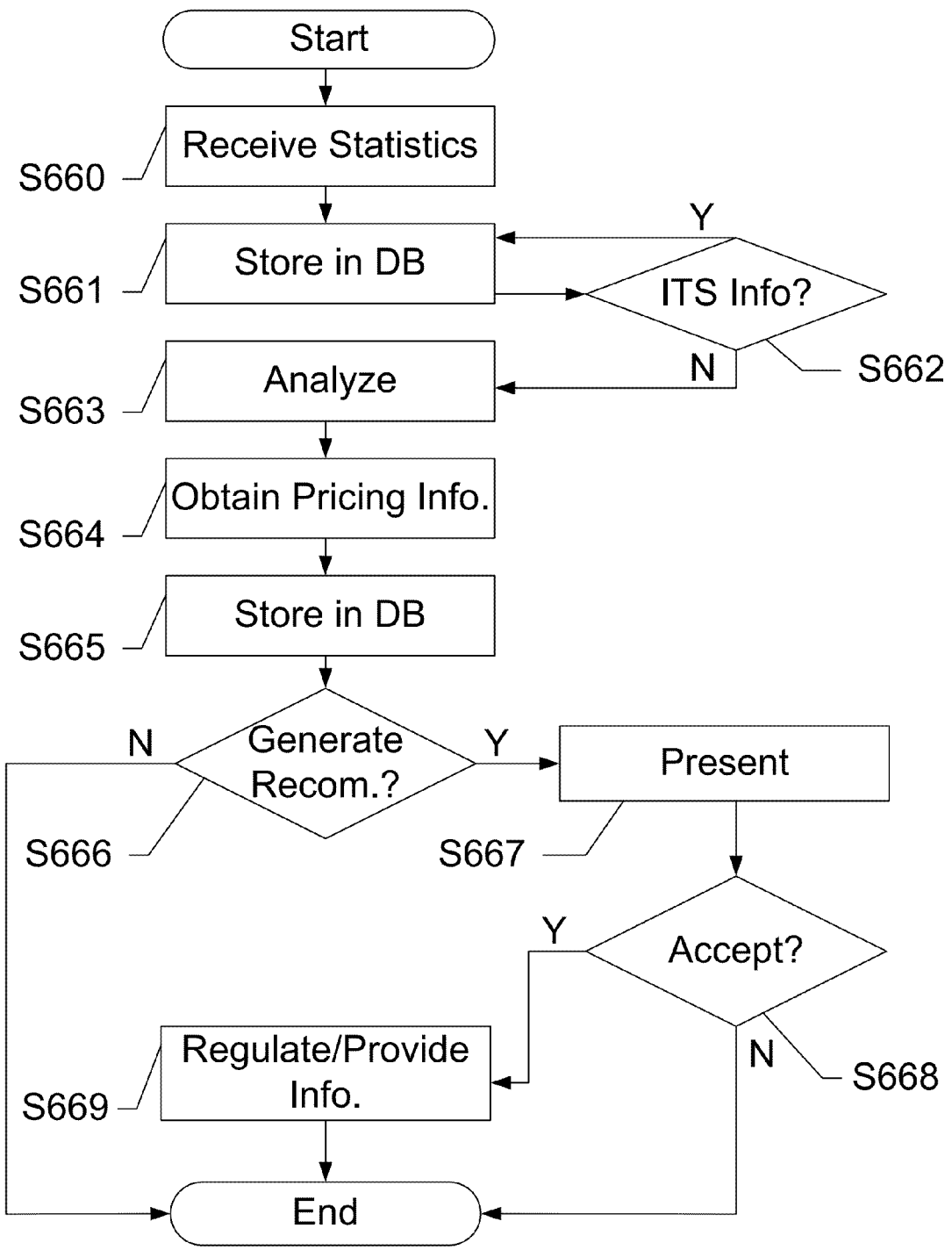
FIG. 6 shows a method for recommending optimal vehicle usage, according to an example embodiment of the subject disclosure.

FIG. 6 shows a method for recommending optimal vehicle usage, according to an example embodiment of the subject disclosure. The method may begin with receiving statistical data regarding vehicle usage and driving behavior of the vehicle's driver or the consumer at a server such as the server described herein (S660). The data may be transmitted to the server via a plurality of sensors coupled to the vehicle, or to resource outputs that provide resources to the vehicle such as power outlets, fuel pumps, etc. Sensors coupled to the user's mobile device may also track statistical data related to usage of the vehicle. Statistical data collected by the sensor may include average and current speed of the vehicle, fuel consumption of the vehicle, amount of remaining fuel or battery power, miles traveled on any given instance of using the vehicle as well as the overall mileage on the vehicle, time of vehicle usage, frequency of vehicle usage, etc. A number of passengers being transported, weight of each passenger, contents of the trunk, engine/spark plug/air filter condition, or any other factor that affects fuel economy may be detected by the sensors. Driving behavior of the vehicle's driver may include behavior which may affect the energy consumption by the vehicle including any stopping patterns, speeding patterns, changing gear patterns, etc. The sensor may also be connected to an Engine Control Unit (ECU) providing further information pertinent to resource consumption of the vehicle. The ECU may be a type of electronic control unit that controls a series of actuators on an engine to ensure the optimum running. The ECU may perform and gather information on air/fuel ratio, ignition timing, control of idle speed, variable valve timing, etc.

Collected statistical data may then be saved in a database such as database described herein (S661). The server may further connect with a ITS such as ITS described herein (S662). The ITS may provide inventory information regarding items that may have depleted or may be near depletion and thus may need to be replaced. If the ITS provides any such information, the process may revert back to S661 where the data provided by the ITS may also be saved in the database for analysis. If the ITS does not provide any such information, a logic located on the server may perform an analysis on the vehicle consumption based on the information saved in the database (S663). The analysis performed by the logic may include the amount of distance that the vehicle travels without refueling and/or recharging, alternative routes that may be taken by the driver so that the vehicle consumes the least amount of resources, closest locations that may be along the way traveled by the vehicle at which the driver may obtain more resources, etc. The logic may also incorporate data received from the ITS into the analysis. The logic may then determine that while the driver is using the vehicle, it may be the most resource efficient use of the vehicle if the driver picks up a replacement for a depleted or near depletion item from a store. For example, the logic may determine that while the driver is on his way back home, it may be efficient for him or her to pick some milk from a grocery store located along the driver's path.

The server may also obtain any relevant pricing information for depleted or near depleted items indicated by the ITS or received from a merchant server (S664). For example, the logic may obtain a price check on milk at different grocery stores, which may be recommended to the consumer. The logic may obtain a gas price check on different gas stations that may be visited by the driver upon presenting a recommendation to the driver. Thereafter, results of the analyses performed by the logic in S663, pricing information obtained in S664, and any combination thereof may be stored in the database for future reference (S665).

The logic may then determine if a recommendation is needed (S666). Such a determination may be based on a driver-initiated request to obtain a recommendation, may be based on a driver-specified time to present the recommendation to the driver, may be automatic, or any combination thereof. For example, the driver may have specified, upon subscribing to the system, that a recommendation be sent to the driver every morning, every evening, every time the vehicle is in use, etc. The driver may even initiate such a request at any time that he or she may desire. In an event when there is no driver-specified time or a spontaneous request to receive a recommendation, the server may automatically decide to present a recommendation to the driver through an e-mail message, a push notification popping up on the consumer's mobile device, etc. For instance, the server may determine that a threshold of resource consumption has been crossed, and transmits a recommendation automatically. The driver may then have the option of accepting the recommendation, rejecting the recommendation, saving the recommendation to be reviewed later, and any combination thereof.

If the server determines that no recommendation is needed, the method may end. However, should the server deem the generation of a recommendation appropriate, the recommendation may be generated and subsequently presented to the driver (S667). For example, the server may alert the driver that the vehicle is operable for an additional 3 miles before the remaining gas in the vehicle completely runs out and that the driver may want to refuel at a gas station located 1 mile down the road. An alternative recommendation may be that the driver drives at a specified lower speed so as to make it to the destination. Yet another alternative recommendation may be that the driver buys some milk from a grocery store located along the way. As discussed with respect to FIG. 1, data on gas stations, charging stations, store locations, etc. may be obtained from using a location provided by a GPS receiver.

Upon presenting the recommendation to the driver, for instance via a mobile device or an interface located inside the vehicle, the driver may either accept or reject the recommendation (S668). If the driver decides not to accept the recommendation, the process may end. However, if the driver decides to accept the recommendation, the logic may proceed to regulating the vehicle, providing information relevant to the accepted recommendation, and any combination thereof (S669). The server may provide the driver with information on recommended gas stations, charging stations, alternative routes, store locations, etc. Such information may again be displayed on the driver's mobile device, the electronic display located inside the vehicle, and any combination thereof. In addition, the recommendation may have included a suggestion to drive at a maximum speed of 30 mph so as to avoid the need to visit the gas station. Upon the recommendation being accepted, the logic may send a control command to the sensor located inside the vehicle to set the maximum speed of the vehicle to 30 mph. The sensor may in turn relay the control command to the ECU, which may control the engine. For safety reasons, such a limit may be easily overridden by the driver by, for instance, pushing a button, shifting gears, a voice command, etc. Alternatively, the recommendation may have included a list of least expensive gas stations at which the driver may fill up the vehicle's tank.

Figure 7:
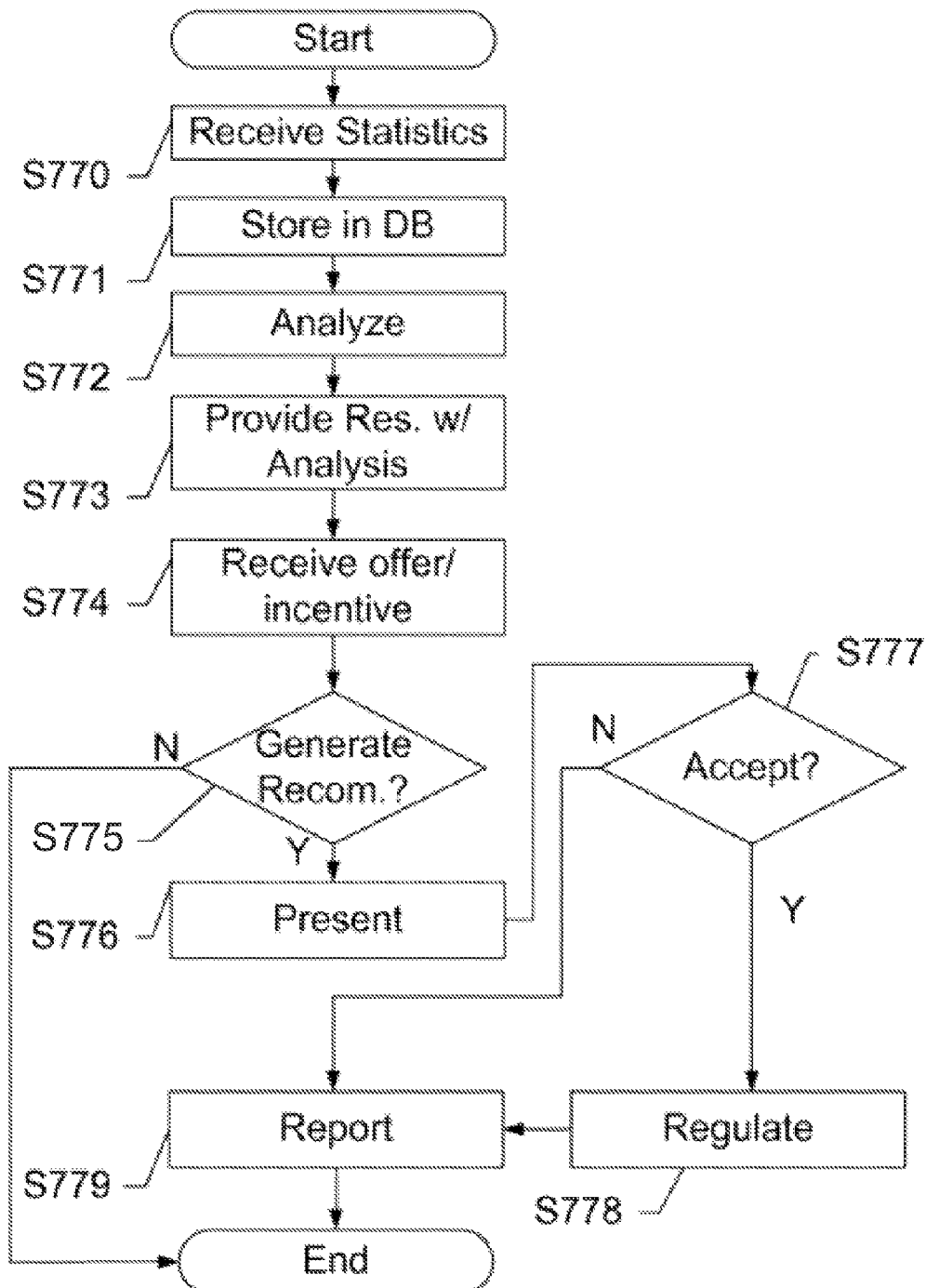
FIG. 7 shows a method for recommending offers in exchange for less consumption by a consumer, according to an example embodiment of the subject disclosure.

FIG. 7 shows a method for recommending offers in exchange for less consumption by a consumer, according to an example embodiment of the subject disclosure. The method may begin with receiving statistical data regarding resource consumption (S770). Statistical data regarding resource consumption may have been collected via a variety of sensors such as the sensors described herein. Statistical data may then be stored in a database (S771). A logic located on the server may perform a variety of analyses on the stored statistical data (S772), as described herein. The analyses performed may include determining trends in times of resource consumption, frequency of resource consumption, amount of resource consumption, number of end equipment using the same resource separately and/or simultaneously, number of end equipment using a combination of two or more resources, etc. For example, the logic may determine the amount of electricity used in the consumer's kitchen versus the amount used in the living room. Alternatively, the logic may determine which equipment use resources constantly and which ones use resources sporadically. The analyses may further include a determination of activities performed regularly by a consumer. For example, the logic may determine that the consumer may be using a specific outlet located in the master bedroom to charge his or her mobile device every night. The logic may further determine that the consumer may use a power outlet located in the garage to charge his or her electrical vehicle every evening. Furthermore, the logic may determine that for example, the consumer may be using the shower every morning between 6:30 a.m. and 7:00 a.m. for a period of 10 minutes. The analysis may further include a determination of resource consumption by a plurality of consumers located in the same geographical proximity as described with respect to FIG. 5, a determination of vehicle resource consumption as discussed with respect to FIG. 6, and any combination thereof.

Having performed the variety of analyses, the results may then be communicated to resource providers via, for instance, resource servers such as the ones described herein (S773). Resource providers may perform independent analyses on the received data considering resource consumption, production capacity, financial constraints, etc. Based on these independent analyses, resource providers may calculate appropriate personalized credits and discounts to be offered to one or more consumers. For example, a power provider may determine that a particular consumer may be using too much electricity during peak hours such as simultaneously running a dishwasher, a washer/dryer, an electric oven, charging his electric vehicle, etc., and may calculate an incentive to be provided to the consumer. For example, the incentive may be in the form of a credit if the consumer uses the washer/dryer every other day during off peak hours. The incentive may also be in the form of a discount on the peak hour charging rate for the consumer if the consumer discontinues using the dishwasher during peak hours. In an alternative example, the consumer may be experiencing power outages or "brownouts" during peak hours, while not making use of abundant electrical resources during off-peak hours. In this case, the incentive may include discounted rates during off-peak hours, with the hope that the consumer modifies his schedule accordingly.

Once the credit/incentive offer(s) have been calculated, they may be forwarded back to the server (S774). The logic may determine if a recommendation to the consumer should be generated using the analyses performed in S772 as well as the credit/incentive offer(s) received from resource providers (S775). Such determination may be based on a consumer-initiated request to obtain a recommendation, may be based on a consumer-specified time to present the recommendation, or may be automatic. For example, the consumer may have specified, upon subscribing to the system, that a recommendation including possible credit/incentive offer(s) be sent to the consumer at the end of each month, billing cycle, etc. The consumer may even initiate such a request at any time that he or she may desire. In an event when there is no request being made or initially specified, the server may automatically decide to present a recommendation to the consumer through an e-mail message, a push notification popping up on the consumer's mobile device, etc. The consumer may then have the option to of accepting the recommendation, rejecting the recommendation, and saving the recommendation to be reviewed later.

If the server determines that no recommendation is needed, the method may end. However, should the server deem the generation of a recommendation appropriate, the report may be generated and subsequently presented to the consumer (S776). The recommendation presented to the consumer may be exactly the same as the credit/inventive offer(s) provided by the resource provider or may be some variation thereof. For example, the server may recommend that only the dishwasher not be used during peak hours for discounts on peak hour rates. The presented recommendation may simply include the discount, or may include additional recommendations such as those discussed with respect to S446 in FIG. 4. In some example embodiments, the recommendation may be provided directly from the resource provider, or from any combination of the resource provider and the service provider.

The consumer may then be given an option to accept or reject the recommendation (S777). If the consumer rejects the recommendation, a report of the rejection may be communicated back to the resource server informing them that the credit/incentive offer(s) have been rejected (S779). This preference may be used in an effort to customize the recommendations for that particular consumer. Thereafter, the process may end. However, if the consumer accepts the recommendation, the process may proceed to regulating the equipment to comply with the accepted recommendation (S778). For example, if the accepted offer had been a credit on the next billing statement if the consumer only uses the washer/dryer once a week on Thursdays, the logic may direct the washer/dryer (or appropriate sensor attached to the washer/dryer) to cut the supply of electricity and water to the washer/dryer at all times except Thursdays.

Figure 8A:
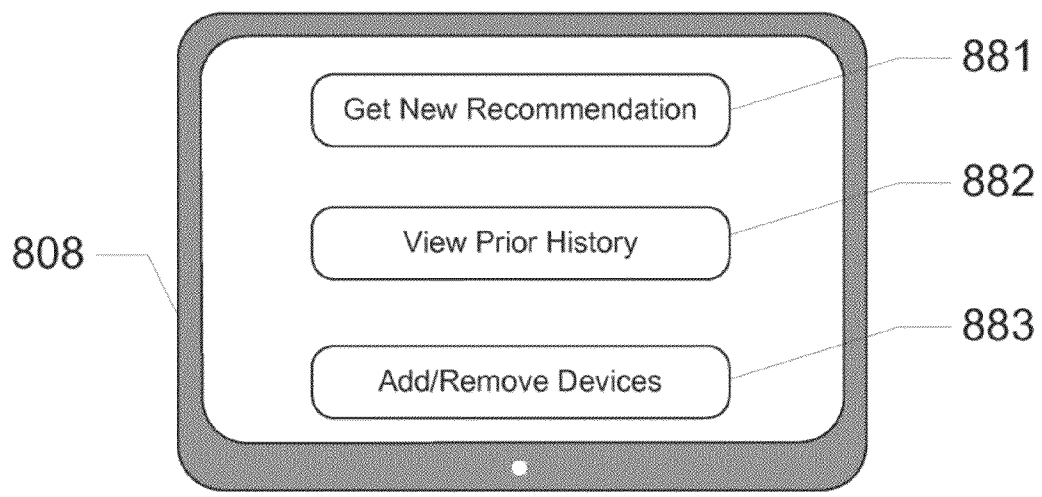
FIGS. 8A-E show a software application for optimal resource consumption, according to an example embodiment of the subject disclosure.

FIGS. 8A-E show a software application for optimal resource consumption, according to an example embodiment of the subject disclosure. FIG. 8A shows an application 808, which may be installed on a consumer's mobile device, stationary electronic equipment capable of communication over a network, and any combination thereof. For example, a television set that may connect to the Internet and further includes an interactive menu through which the consumer may perform web browsing may also be used as the stationary electronic equipment. Once activated, the consumer may be presented with a plurality of selectable options including obtaining a new recommendation 881, viewing prior recommendations 882, adding/removing equipment 883, etc. Selecting the prior recommendations 882 directs the consumer to prior recommendations generated and stored on a server, and may enable the user to browse their own usage history and observe trends in their usage history. It may also include recommendations that may have been generated but saved for later viewing by the consumer. Selecting the adding/removing equipment 883 enables the consumer to enter pertinent information regarding sensors that may have been installed on a new equipment such a new toaster. The addition of new equipment and corresponding sensors may be done through the RFID, the camera, or the microphone described in FIGS. 2-3. The consumer may simply capture identifying information corresponding to the added equipment and device and transmit such information to the server. The server may then make an entry for the device under the consumer's profile. Choosing option 883 may further enable the consumer to remove an already existing end equipment and sensor from the list of monitored equipment and sensors located in the database. For example, the consumer may have disposed of an old television set, a corresponding sensor, and any combination thereof. As a result the consumer may be given an option to remove the old television set, the corresponding sensor and any combination thereof, from a list of equipment on the server that are being monitored.

Figure 8B:
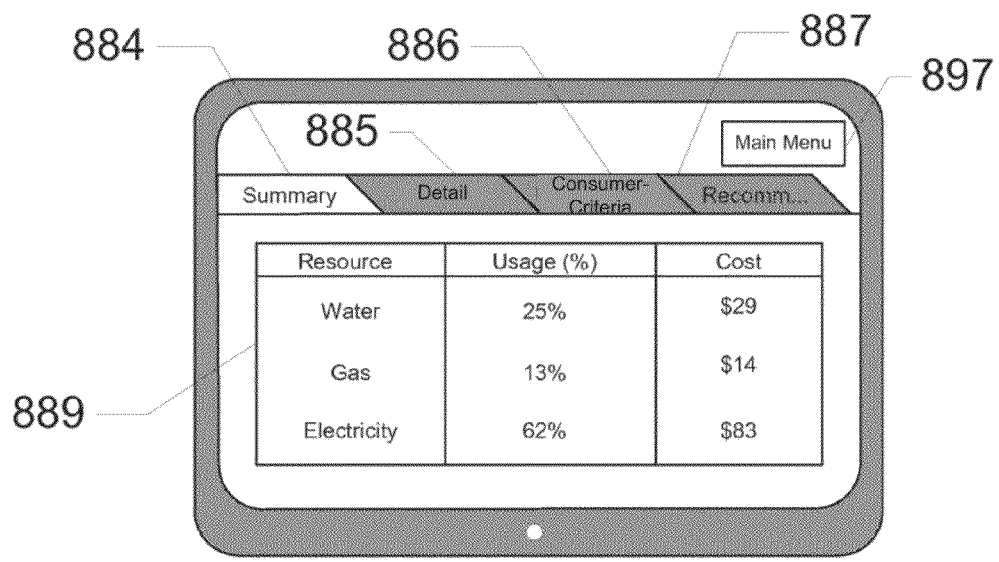

FIG. 8B shows application 808 when the consumer selects obtaining new recommendation 881. The consumer may be presented with a screen containing several different tabs including Summary 884, Detail 885, Consumer-Criteria 886, and Recommendation 887. Summary 884, also shown in FIG. 8C, may be the default tab appearing when new recommendation 881 is selected. The consumer may be able to obtain a summary 889 of the overall up-to-date resource consumption from the beginning of a current billing cycle to date. Summary 889 may be in the form of a tabular representation containing types of resources such as gas, water, electricity, etc., consumption of each as a percentage of the whole, and the overall cost of each resource in the current billing cycle. This tabular representation is also depicted in FIG. 8B. Summary 889 may also be presented in other graphical forms such as graphs, charts, etc. The consumer may return to the main menu as depicted in FIG. 8A, at any time by selecting Main Menu 897.

Figure 8C:
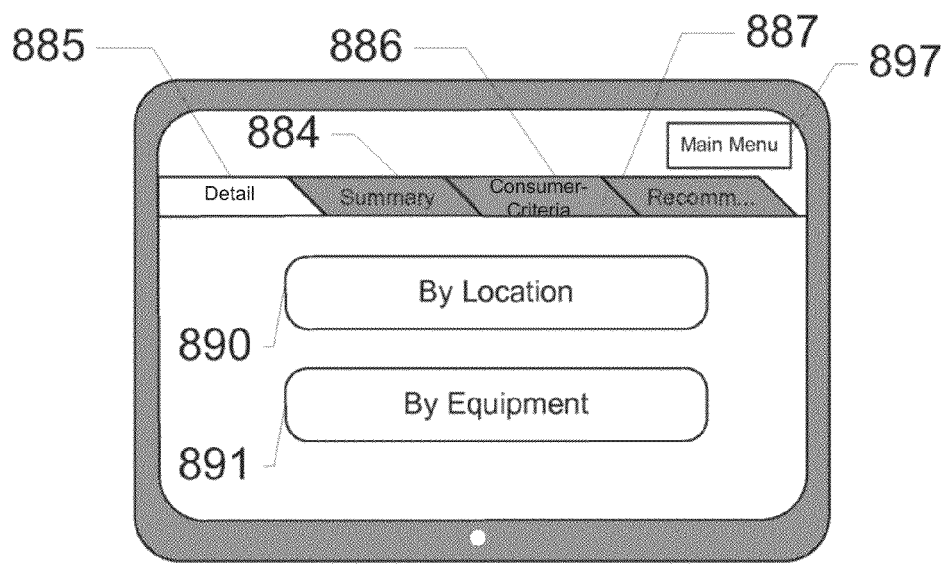

FIG. 8C shows application 808 when the consumer selects the tab corresponding to Detail 885. Therein, the consumer may further be given different options such as viewing analysis by location 890 or by equipment 891. Analysis by location 890 may combine detailed statistics of all the electronic equipment that may be located in a kitchen of the consumer's house. Selecting analysis by equipment 891 may enable the consumer to view a variety of information for all equipment to which a sensor such as sensors described herein may be attached. The variety of information may include percentage of resource used by the equipment, cost of resource used by the equipment, frequency of consumption of the equipment, time periods during which the equipment may have been used, comparison of consumption in the current billing cycle compared to the previous billing cycle, etc. The consumer may return to the main menu as depicted in FIG. 8A, at any time by selecting Main Menu 897.

Figure 8D:
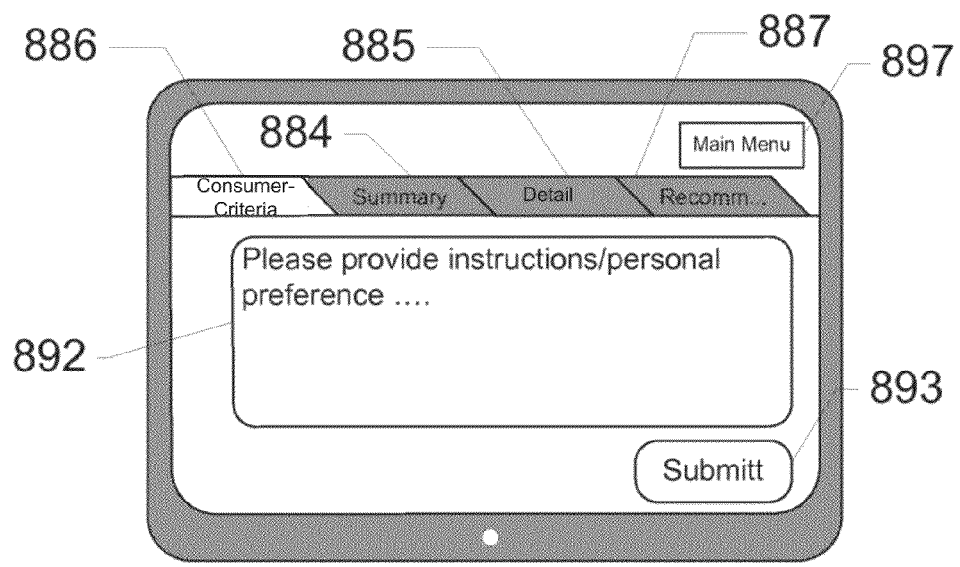

FIG. 8D shows application 808 when the consumer selects the tab corresponding to Consumer Criteria 886. Selecting this tab may present the consumer with a window 892 in which he or she may specify any constraints, limitations, equipment priority, sequence of equipment usage, etc. For example, the consumer may enter any budgetary constraints that he or she may want the server to take into consideration when providing a recommendation. The consumer may even provide instructions as to which equipment may or may not need constant supply of a resource as well as any time periods during which such supply may or may not be needed. The consumer may speak or type in any consumer criteria that he or she may wish to communicate to the server. Once the consumer completes entering any consumer criteria, he or she may send the criteria to the server by clicking on the submit button 893. The consumer may return to the main menu as depicted in FIG. 8A, at any time by selecting Main Menu 897.

Figure 8E:
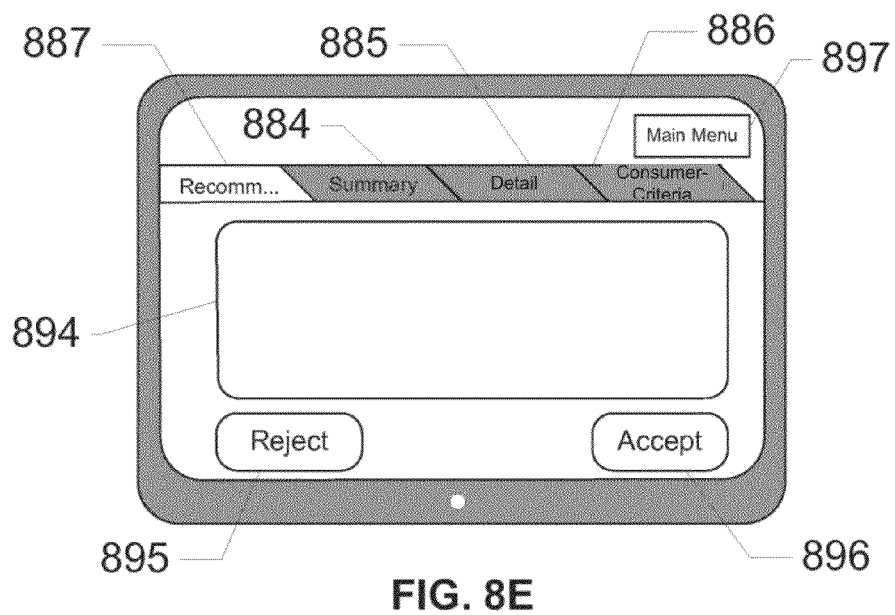

FIG. 8E shows application 808 when the consumer selects the tab corresponding to Recommendation 887. Selecting this tab may present the consumer with a window 894 in which a list of recommendations may be presented to the consumer. The consumer may scan the list of provided recommendations scrolling up and down the window 894 through touching the display of the device or using up/down buttons located on the device's keypad. Any provided recommendation shown in window 894 may either be rejected by selecting Reject button 895 or accepted by selecting Accept button 896. The consumer may return to the main menu as depicted in FIG. 8A, at any time by selecting Main Menu 897.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A system comprising:
a processor; and
a memory that stores instructions that, when executed by the processor, cause the processor to perform operations comprising:
registering a sensor associated with an equipment consuming a resource, wherein registering the sensor comprises receiving, from a mobile device comprising a camera, an image, captured by the camera, of information identifying the sensor,
receiving, from the sensor via the mobile device, statistical data related to consumption of the resource, wherein the statistical data comprises a user-defined attribute appended to the statistical data by the mobile device,
performing an analysis on the statistical data received from the sensor,
determining, based at least in part on a criteria specified by a user and on the analysis performed on the statistical data, whether to provide, to the user, a recommendation associated with the consumption of the resource, and
in response to determining, based at least in part on the criteria specified by the user, to provide the recommendation associated with the consumption of the resource to the user,
generating, based at least in part on a result of analyzing the statistical data, the recommendation associated with the consumption of the resource, and
providing the recommendation for presentation to the user.

2. The system of claim 1, wherein providing the recommendation for presentation to the user comprises sending the recommendation to the mobile device associated with the user.

3. The system of claim 1, wherein the operations further comprise receiving inventory data from a tracking inventory system.

4. The system of claim 3, wherein generating the recommendation comprises generating the recommendation based at least in further part on the inventory data.

5. The system of claim 1, wherein the operations further comprise receiving data from a resource server, the resource server associated with a resource provider servicing the equipment, and wherein generating the recommendation comprises generating the recommendation based at least in further part on the data received from the resource server.

6. The system of claim 5, wherein the operations further comprise storing, in a database, the statistical data, the result of analyzing the statistical data, and the data received from the resource server.

7. The system of claim 5, wherein the data received from the resource server comprises resource availability and pricing information.

8. The system of claim 1, wherein the result of analyzing the statistical data comprises determining behavior of the user based at least in part on the consumption of the resource and determining resource consumption trends based at least in part on the consumption of the resource.

9. The system of claim 1, wherein the operations further comprise receiving, from the mobile device, a task needed to be performed by the user, and wherein generating the recommendation comprises considering an availability of the resource to perform the task and a cost of using the resource.

10. The system of claim 9, wherein the task needed to be performed by the user comprises purchasing a product and wherein generating the recommendation comprises obtaining data regarding an optimal location to purchase the product.

11. A method comprising:
registering, at a server comprising a processor, a sensor associated with an equipment consuming a resource, wherein registering the sensor comprises receiving, at the server from a mobile device comprising a camera, an image, captured by the camera, of information identifying the sensor;
receiving, at the server from the sensor via the mobile device, statistical data related to consumption of the resource, wherein the statistical data comprises a user-defined attribute appended to the statistical data by the mobile device;
performing, by the server, an analysis on the statistical data received from the sensor;
determining, based at least in part on a criteria specified by a user and on the analysis performed on the statistical data, whether to provide, to the user, a recommendation associated with the consumption of the resource; and
in response to determining, based at least in part on the criteria specified by the user, to provide the recommendation associated with the consumption of the resource to the user,
generating, based at least in part on a result of analyzing the statistical data, the recommendation associated with the consumption of the resource, and
providing the recommendation for presentation to the user.

12. The method of claim 11, further comprising receiving data from a resource server, the resource server associated with a resource provider servicing the equipment, and wherein generating the recommendation comprises generating the recommendation based at least in further part on the data received from the resource server.

13. The method of claim 12, further comprising storing, in a database, the statistical data, the result of analyzing the statistical data, and the data received from the resource server.

14. The method of claim 11, wherein presenting the recommendation to the user comprises sending the recommendation to the mobile device associated with the user.

15. The method of claim 14, further comprising:
receiving an acceptance of the recommendation; and
in response to receiving the acceptance of the recommendation, regulating a supply of the resource to the equipment.

16. The method of claim 11, further comprising receiving a plurality of statistical data associated with a plurality of consumers in geographic proximity, and wherein generating the recommendation further comprises generating the recommendation based on the plurality of statistical data.

17. The method of claim 11, wherein the equipment is a vehicle and the recommendation is associated with the consumption of the resource by the vehicle.

18. The method of claim 11, wherein the recommendation comprises an offer of credit by a resource provider in exchange for less consumption of the resource provided by the resource provider.

19. The method of claim 11, further comprising receiving, by the server and from the mobile device, a task needed to be performed by the user, and wherein generating the recommendation comprises considering an availability of the resource to perform the task and a cost of using the resource.

20. A non-transitory computer-readable medium that stores instructions that, when executed by a processor, causes the processor to perform operations comprising:
registering a sensor associated with an equipment consuming a resource, wherein registering the sensor comprises receiving, from a mobile device comprising a camera, an image, captured by the camera, of information identifying the sensor;
receiving, from the sensor via the mobile device, statistical data related to consumption of the resource, wherein the statistical data comprises a user-defined attribute appended to the statistical data by the mobile device;
performing an analysis on the statistical data received from the sensor;
determining, based at least in part on a criteria specified by a user and on the analysis performed on the statistical data, whether to provide, to the user, a recommendation associated with the consumption of the resource; and
in response to determining, based at least in part on the criteria specified by the user, to provide the recommendation associated with the consumption of the resource to the user,
generating, based at least in part on a result of analyzing the statistical data, the recommendation associated with the consumption of the resource, and
providing the recommendation for presentation to the user.

\* \* \* \* \*